Oct. 16, 1928.
H. F. RUGGLES
1,687,894
HOISTING AND WEIGHING MEANS
Filed Feb. 15, 1923   3 Sheets-Sheet 1
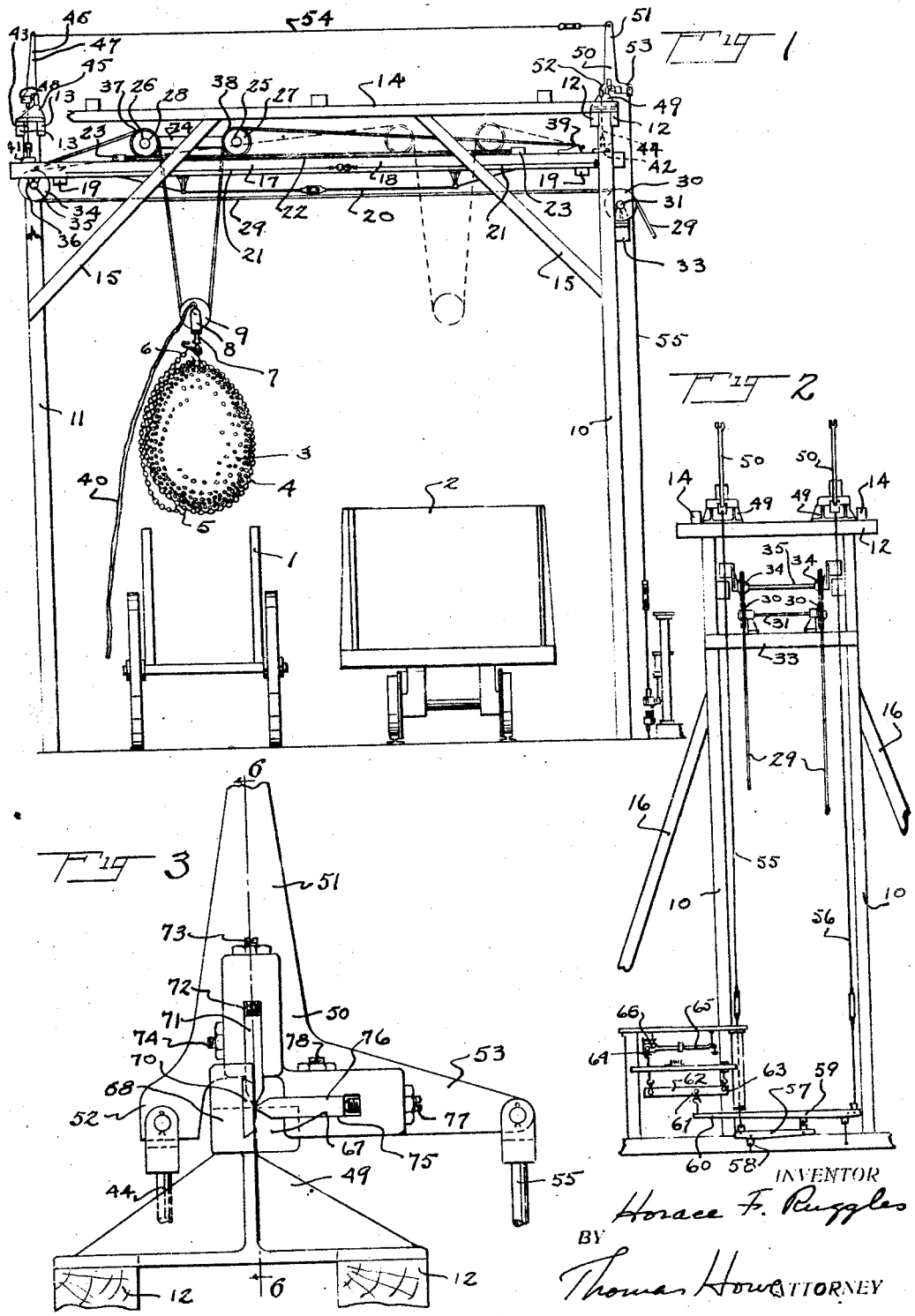
INVENTOR
Horace F. Ruggles
BY
Thomas Howe ATTORNEY

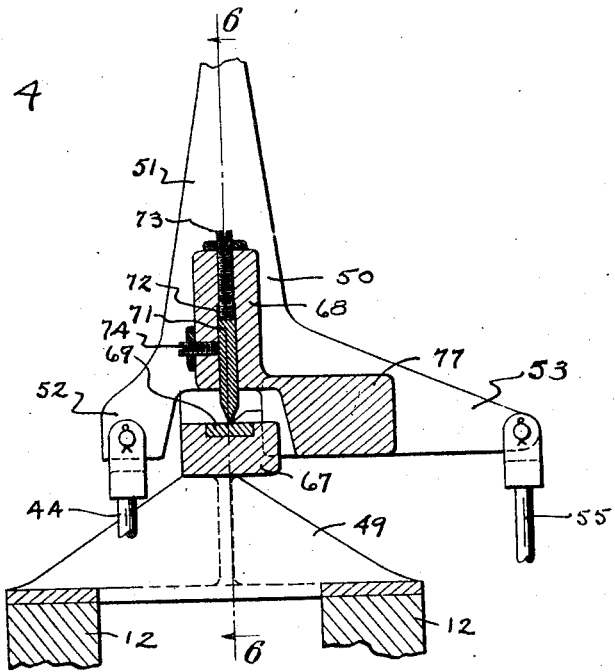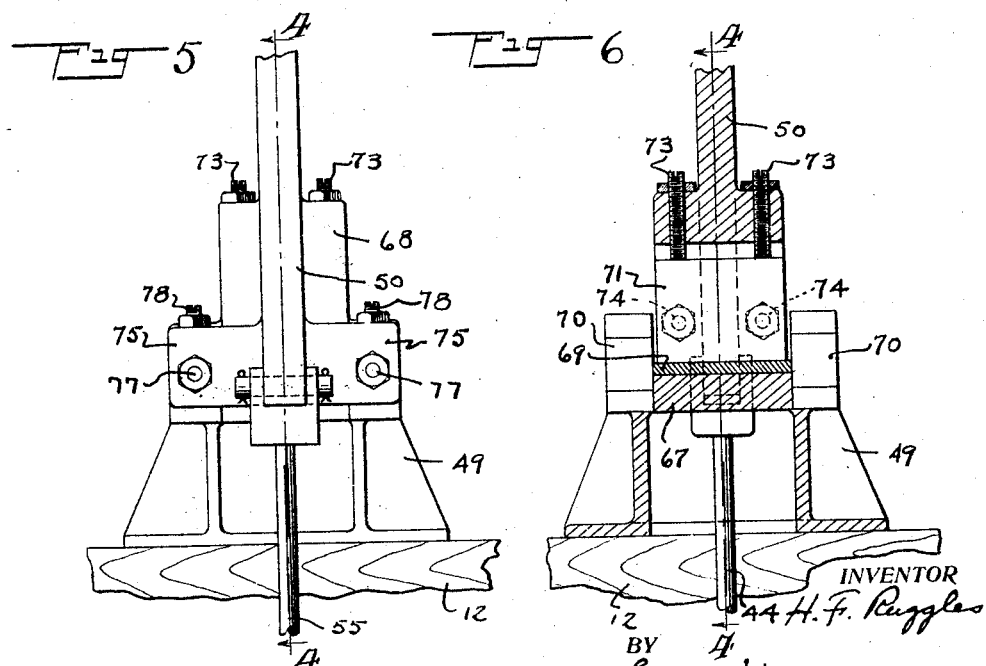

Oct. 16, 1928.
H. F. RUGGLES
HOISTING AND WEIGHING MEANS
Filed Feb. 15, 1923
1,687,894
3 Sheets-Sheet 3
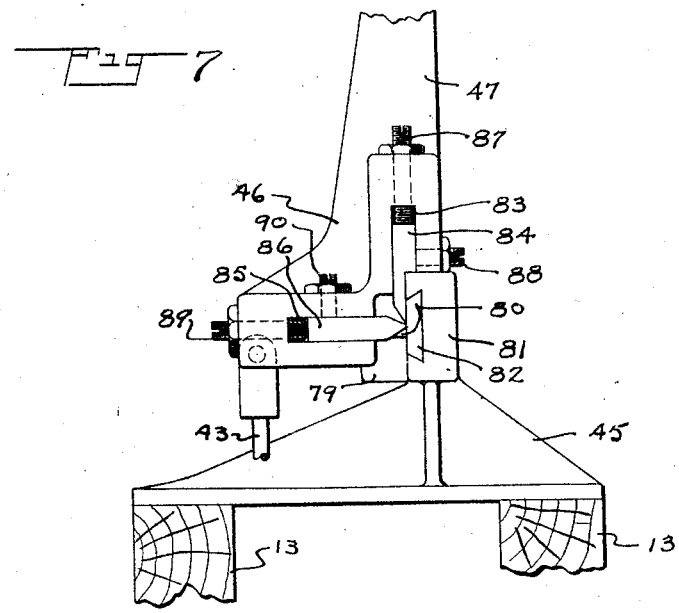
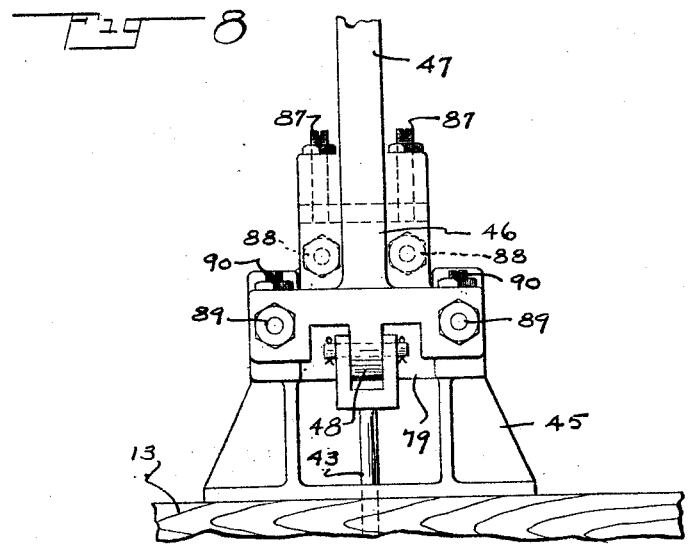

Patented Oct. 16, 1928.

1,687,894

UNITED STATES PATENT OFFICE.

HORACE F. RUGGLES, OF BROOKLYN, NEW YORK.

HOISTING AND WEIGHING MEANS.

Application filed February 15, 1923. Serial No. 619,164.

This invention relates generally to weighing devices or scales, and relates particularly to weighing devices of that kind or class which are embodied in and form a feature of cane hoisting and weighing apparatus. In such apparatus, a cart load of cane is hoisted from the cart, weighed while hoisted, traversed while hoisted, and dumped into a railway car standing alongside the cart. In a form of such apparatus commonly heretofore employed, a framework forms a tower having uprights forming legs between which the cart, upon which the cane is brought in from the field, and a railway car, upon which the cane is to be loaded for transportation, may stand side by side, the upper ends of the legs being connected together by one or more transverse overhead beams, the tower structure or framework further including suitable braces. A floating weighing platform is suspended at each of its corners by means of links connected at their upper ends to substantially horizontal arms of weight-transmitting levers having also upstanding arms. These horizontal lever-arms all project or extend in the same direction longitudinally of the platform, and the upstanding lever-arm of each lever at one end of the platform is connected by a link with the upstanding lever-arm of the lever at the same side and other end of the platform, so that the pair of levers at one end of the platform rock in unison with the pair of levers at the other end of the platform. The levers at one end of the platform are connected by means of links to a scale (including a weigh-beam) at the foot of the tower, for this purpose the latter levers being provided with additional substantially horizontal arms projecting oppositely to their platform-connected arms, so that the levers at one end of the platform are three-armed levers while those at the other end of the platform are two-armed or bell-crank levers. All the above-noted levers carry knife-edges which fulcrum upon horizontal fulcrum surfaces on brackets or bearing stands mounted on the top of the tower, means, for example, forks or other upright portions on the brackets, being provided to prevent the knife-edges from sliding off the bearing surfaces on the brackets.

In operation, the downward strain upon the fulcra of the levers, including the weight of the platform and the hoisted load, is sustained by the fulcrum bearings provided by the knife-edges and fulcrum surfaces of the bearing stands. However, there is a lateral or horizontal strain upon the fulcra of the levers, by reason of the lateral or horizontal strain upon their upstanding lever-arms, through the horizontal links which connect these arms. In practice it has been found that the horizontal strain upon the fulcra of the levers tends to dislodge the knife-edges, causing them to jump or slide upon the fulcrum surfaces on the bearing stands or brackets, so that the knife-edges are soon blunted and must be replaced. In the above noted apparatus, the horizontal strain upon the fulcra of the weight-transmitting levers at all times acts as a brake to impair accuracy in weighing, and the accuracy is much further impaired when the sharpness of the knife-edges has been destroyed.

The object of this invention is to eliminate the above noted difficulties in cane hoisting and weighing apparatus, and also in other scales or weighing devices where similar difficulties may exist.

According to this invention, for each weight-transmitting lever subject to separate strains in different directions upon its fulcrum, separate knife-edge fulcrum bearings are provided to receive the separate strains, the knife-edges of the separate knife-edge bearings being disposed in alignment along a common fulcrum axis. More particularly, in embodying the invention in a cane hoisting and weighing apparatus such as above noted, or in similar embodiments of the invention, a knife-edge fulcrum bearing is provided to receive the downward strain upon the weight-transmitting lever and a separate knife-edge fulcrum bearing is provided to receive the lateral or horizontal strain upon the lever. The invention further includes features of construction and combinations of parts, as will hereinafter appear.

Reference will now be had to the accompanying drawings.

Fig. 1 is a side elevation of a cane hoisting and weighing apparatus embodying the present invention;

Fig. 2 is an end elevation as viewed from the right in Fig. 1, with parts omitted;

Fig. 3 is an enlarged elevation of the three-armed weight-transmitting lever, and the bearing stand or fulcrum bracket therefor, as seen at the top and right in Fig. 1 and also shown in Fig. 2 at the top and left;

Fig. 4 is a vertical section on the line 4—4 of Figs. 5 and 6;

Fig. 5 is an elevation as viewed from the right in Figs. 3 and 4;

Fig. 6 is a vertical section on the line 6—6 of Figs. 3 and 4.

Fig. 7 is a view similar to Fig. 3 of one of the weight-transmitting, bell-crank levers and its bearing stand or fulcrum bracket, shown at the top and left in Fig. 1; and Fig. 8 is an elevation as viewed from the left in Fig. 7.

The general construction and operation, as a whole, of the complete cane hoisting and weighing device or apparatus, shown in Figs. 1 and 2, will first need to be described, in order that the embodiment therein of the present invention may be understood.

It is desired to lift or hoist the cane from a field cart 1, weigh it and transfer it to a waiting railway car 2 standing alongside the cart. The load of cane 3 is encircled by usual sling-chains 4, each of which is provided with a releasable trip-hook 5, which, when the load 3 is to be dumped with the car 2, is released by a pull upon the free end portion 6 of the chain 4. The sling-chains 4 are arranged along and carried by a sling-beam 7, provided at each end with a pulley block 8 in which is journaled a pulley 9.

A tower-forming framework stands over and bestrides the cart 1 and car 2 and comprises a pair of leg-forming uprights 10 outwardly from the outer side of the car 2, a similar pair of leg-forming uprights 11 outwardly from the outer side of the cart 1, a pair of transverse tie-beams 12 connecting the upper ends of the uprights 10, a similar pair of tie-beams 13 connecting the upper ends of the other uprights 11, a pair of overhead side beams 14 tying together the ends of the pairs of transverse beams 12 and 13, angle braces 15 between the overhead side beams 14 and the corresponding uprights, and inclined ground braces 16 for the uprights.

A floating overhead weighing platform 17 is carried by the tower or framework by means involving the present invention and hereinafter to be described. The weighing platform 17 comprises longitudinal beams 18 and cross-beams 19, and is strengthened by truss-rods 20. Longitudinal swaying of the suspended weighing platform 17 is prevented by means of usual drag links 21 which connect the platform to the framework. Track-rails 22 are laid along the longitudinal beams 18 of the platform and terminate at stop-blocks 23. A truck 24 has a front axle 25 and a rear axle 26 upon which are mounted, respectively, a pair of front track-wheels 27 and a pair of rear track-wheels 28.

A pair of hoisting cables 29 may be drawn upon by means of any suitable source of power, such as a draft animal, an electric motor, or a hoisting engine, which may be a steam engine or of the internal combustion type. The hoisting cables 29 pass from the source of power over pulleys 30 on the ends of a shaft 31 mounted in brackets 32 on a cross beam 33 extending between the uprights 10. The cables 29 extend horizontally to the other end of the platform 17, adjacent the uprights 11, and pass upwardly over pulleys 34 on a shaft 35 mounted in hangers or brackets 36 on the longitudinal beams 18 of the weighing platform 17. From the pulleys 34 the cables 29 pass laterally at an upward inclination over a pair of pulleys 37 on the rear truck-axle 26, thence downwardly around the hereinbefore mentioned pulleys 9 on the sling-beam 7, thence upwardly over a pair of pulleys 38 on the front truck-axle 25, and thence laterally towards the right, as viewed in Fig. 1, to points adjacent the end of the platform 17, where the end of the cables are secured to anchor-blocks 39 which are fixed upon the longitudinal beams 18.

When the load of cane 3 has been hoisted, as shown in Fig. 1, weighed by means yet to be described, and traversed beneath the platform 17 to a position above the car 2, as indicated in broken lines in Fig. 1, it is, preferably after being lowered somewhat, dumped into the car 2, by releasing the slip-hooks 5, as hereinbefore described. When the load 3 is traversed, the truck 24 travels along the track-rails 22, and in the particular apparatus shown in the drawings this traversing of the load 3, and the return of the empty slings, may be accomplished manually by means of a rope 40 depending from the sling-beam 7.

The floating weighing platform 17 is suspended at each of its corners. At the left end of the platform, as viewed in Figure 1, brackets 41 are secured upon the longitudinal beams 18, and similar brackets 42 are secured upon the beams 18 at the other end of the platform. At the left end of the weighing platform a pair of suspension links 43 are pivoted at their ends to the brackets 41, and a similar pair of suspension links 44 are pivoted at their lower ends to the brackets 42.

Upon the top of and at the left end of the framework or tower, as viewed in Fig. 1, a pair of bearing stands or fulcrum brackets 45 are mounted upon the tie-beams 12. Upon each of the bearing stands 45 is fulcrumed a weight-transmitting bell-crank lever 46 having a long vertically upstanding arm 47 and a short substantially horizontal weight-carrying arm 48, which projects towards the left as seen in Fig. 1, and to the end of which the upper end of the corresponding suspension link 43 is pivoted. The axis of the fulcrum of each of the bell-crank levers 47 is transverse to the length of the tower and weighing platform 17.

At the other or right end of the tower, as viewed in Fig. 1, a pair of bearing stands or fulcrum brackets 49 are mounted upon the tie beams 12. On each bearing stand 49 there is fulcrumed a three-armed lever 50, the axes of the fulcra of these three-armed levers being arranged in parallel relation to the axis of the fulcra of the bell-crank levers 46. Each three-armed lever 50 has a long vertically upstanding arm 51 and oppositely extending substantially horizontal arms 52 and 53, of which the arm 52 is a short weight-carrying arm projecting towards the corresponding bell-crank lever 46, and the arm 53 is a somewhat longer scale-connected arm. The upper end of the corresponding suspension link 44 is pivoted to the end of the weight-carrying lever-arm 52.

The upper end of the upstanding arm 51 of each three-armed lever 50 is connected to the upper end of the upstanding arm 47 of the bell-crank lever 46 at the same side of the platform 17 by a long horizontal link 54, so that the portion of the weight of the load 3 borne by the left end of the platform 17, as viewed in Fig. 1, will be transmitted by the bell-crank levers 46 to the three-armed levers 50, and thence, through the scale-connected arms 53, to the weigh-beam of the scale, while the portion of the weight of the load 3 borne by the right end of the platform 17 will be transmitted directly from the weight-carrying arms 52 of the three-armed levers 50 to the scale-connected arms 53 thereof.

Long vertical links 55 and 56, are pivoted at their upper ends, respectively, to the ends of the lever-arms 53 of the three-armed levers 50, these links 55 and 56 extending to the foot of the tower where they are connected to a weighing scale, which may be of any suitable construction. In the apparatus shown in the drawings, the lower end of the link 55 is connected to the shorter of an intermediate lever or extension lever 57 of the first order which is pivotally anchored or fulcrumed at 58, and the longer arm of the lever 57 is connected at 59 to an intermediate point on the longer arm of another intermediate or extension lever 60 of the first order, pivotally anchored or fulcrumed at 60ª and to the shorter arm of which the lower end of the other long vertical link 56 is connected. The longer arm of the second intermediate lever 60 is connected at 61 to an intermediate point on a third lever 62, one end of which is fulcrumed at 63 and the other end of which is connected by a link 64 to a weigh-beam 65, forming a lever of the first order, fulcrumed at 66.

The cane hoisting and weighing apparatus, to the extent that it has thus far been described, is of a construction heretofore known and used; and the present invention as embodied therein, and now to be described, relates to the fulcra of the weight-transmitting bell-crank levers 46 and of the weight-transmitting three-armed levers 50.

Obviously there is a downward strain upon the fulcra of the levers 46 and 50 due to the weight of the weighing platform 17 and the weight of the load 3 suspended from and carried by the platform, this strain coming upon the weight-carrying lever arms 48 and 52 of the pairs of levers 46 and 50, the distribution of the weight of the load 3 between the pair of levers 46 and the pair of levers 50 being determined by the position of the load 3 along the weighing platform 17, for example, as shown in full lines in Fig. 1, or as there indicated in broken lines. Furthermore, there is a further downward strain on the fulcra of the pair of three-armed levers 50, due to the reaction caused by the upward pull of their scale-connected arms 53 on the long vertical links 55 and 56, regardless of the proportion of the weight of the load 3 sustained by the respective pairs of levers 46 and 50.

However, in addition to the downward strain on the fulcra of the levers 46 and 50, there is a lateral or horizontal strain upon the fulcra of the levers 46 and 50, due to the weight-transmitting pull of the upstanding lever-arms 47, of the bell-crank levers 46, upon the long horizontal links 54. The pull of the links 54 upon the upstanding lever-arms 51 of the three-armed levers 50 tends to displace these levers at their fulcra horizontally towards the left as viewed in Fig. 1; and, since action and reaction are equal, the links 54 exert a corresponding pull upon the upstanding lever-arms 47 of the bell-crank levers 46 which tends to displace these latter levers at their fulcra horizontally towards the right.

Both the downward and horizontal strains upon the fulcra of the bell-crank levers 46 will vary, as determined by the position of the load 3 along the weighing platform 17; however, the downward strain upon the fulcra of the three-armed levers 50 will remain substantially the same regardless of the position of the load, while the horizontal strain on the fulcra of the three-armed levers 50 will vary, being greater when the load 3 is nearer the left end of the platform 17, as shown in full lines in Fig. 1, and being less when the load is nearer to the right end of the platform as indicated in broken lines in Fig. 1.

The recoil of the structure when the load is released develops stresses and strains which cause a tendency to shift the knife edges on their bearing surfaces which tendency is counteracted by the structure of the knife edge bearings provided.

According to the present invention, each of the weight-transmitting levers 46 and 50 is provided with a knife-edge fulcrum bearing to receive the downward strain upon its fulcrum, and is further provided with a separate knife-edge fulcrum bearing to receive the horiontal strain upon its fulcrum, these separate knife-edge fulcrum bearings being so constructed and arranged that each may act freely in cooperation with the other.

Reference will first be had to the three-armed weight-transmitting levers 50, one of which, together with its fulcrum bracket or bearing stand 49, is particularly illustrated in Figs. 3 to 6 inclusive. The fulcrum bracket 49 has a transverse fulcrum-bar 67 and at each end of the fulcrum-bar 67 has an upstanding fulcrum-lug 68. The fulcrum-bar 67 is provided with a hard inset or countersunk removable and replaceable horizontal fulcrum-plate or fulcrum-block 69 which presents a plane horizontal upper fulcrum surface which lies in the horizontal plane of the fulcrum axis. Each upstanding fulcrum-lug 68 is provided with a hard vertically and transversely arranged fulcrum-plate or fulcrum-block 70 which is removably and replaceably countersunk and dovetailed into the lug so as to present a plane transversely extending vertical fulcrum surface, directed towards the scale-connected lever arm 53 of the three-armed lever 50. The fulcrum surfaces of the fulcrum-plates 70 lie in the vertical plane of the fulcrum axis. The horizontal fulcrum surface of the fulcrum-plate 69 lies between the aligned vertical fulcrum surfaces of the fulcrum-plates 70, so that a common transversely extending horizontal fulcrum axis is provided along a line determined by the bisecting of the horizontal plane of the fulcrum surface of the fulcrum-plate 69 and the vertical plane of the fulcrum surfaces of the fulcrum plates 70.

A hard removable and replaceable knife-edge block or plate 71 is carried by the three-armed lever 50, being vertically and transversely arranged in line with the upstanding lever-arm 51 and with its knife-edge projecting downwardly to fulcrum upon the horizontal fulcrum surface of the horizontal fulcrum-block 69. The knife-edge block 71 is mounted for vertical sliding adjustment, and is shown as contained snugly but slidably in a downwardly opening slot provided by a socket part 72 on the lever 50. The knife-edge block 71 may be forced downwardly by a pair of thrust screws 73 threaded through the top wall of the socket 72, and may be moved upwardly by retracting the screws 73. The two screws 73, one adjacent each end of the knife-edge block 71 at opposite sides of the upstanding lever-arm 52, provide for bringing the knife-edge, throughout its length, into alignment with the fulcrum axis. After the knife-edge block 71 has been adjusted it is secured firmly in place in the socket 72, against possibility of displacement, by means of a pair of set screws or clamp screws 74 threaded through one of the side walls of the socket 72, one being shown at each side of the weight-carrying lever-arm 52.

The three-armed lever 50 is provided with a pair of sockets 75, shown as formed in the same piece therewith, one at each side of the scale-connected lever arm 53, and each having therein a horizontal slot opening inwardly or towards the vertical fulcrum surface of the corresponding vertically arranged fulcrum-block 70. A hard horizontally arranged removable and replaceable knife-edge block 76 is snugly but slidably contained in the slot of each of the sockets 75 with its knife-edge projecting inwardly to abut against and fulcrum upon the vertical fulcrum surface of the corresponding fulcrum-block 70. A thrust screw 77 is threaded through the outer wall of each socket 75, to slide the knife-edge blocks 70 inwardly, and permitting them to be slid outwardly when these screws are retracted. By means of the thrust screws 77 the knife-edges of the horizontal knife-edge blocks 76 may be adjusted into alignment with the fulcrum axis. After the horizontally slidable knife-edge blocks 76 have been adjusted they are firmly secured against displacement by means of set screws or clamp screws 78 threaded through one of the side walls of each of the sockets 75, and shown as passing downwardly through the upper wall.

By adjusting the vertically slidable knife-edge plates on block 71 in a vertical direction and by adjusting the horizontally slidable knife-edge plates on blocks 76 horizontally, the knife-edge of the vertical block 71 and the knife-edges of the horizontal blocks 76 may be brought to a common horizontal fulcrum axis, so that thereby, by reason of the horizontal adjustment of the knife-edges of the horizontal blocks 76, the knife edges of the vertical block 71 will fulcrum upon the horizontal fulcrum surface of the fulcrum block 69 in line with the vertical fulcrum surfaces of the fulcrum blocks 70, and, by reason of the vertical adjustment of the knife-edge of the vertical block 71, the knife-edges of the horizontal blocks 76 will fulcrum upon the vertical fulcrum surfaces of the fulcrum-blocks 70 in line with the horizontal fulcrum surface of the fulcrum-block 69.

The horizontal fulcrum-lock 69 and the vertical knife-edge block 71 together form a middle weight-carrying knife-edge fulcrum bearing to receive the downward strain due to the weight of the load 3, the weighing platform 17 and its adjuncts. This holds true regardless of the position of the load 3 along the platform 17, that is to say, regardless of the portion of the weight of the load 3 sustained by the weight-carrying lever-arms 52 of the three-armed levers 50, through the suspension links 44, or by the weight-carrying lever-arms 47 of the bell-crank levers 46, through the suspension links 43, and transmitted from the bell-crank levers 46, by means of the horizontal links 54 to the three-armed levers 50. The knife-edge fulcrum bearings formed by the fulcrum-blocks 69 and knife-edge blocks 71 also receive the downward strain due to the downward reaction of the lever-arms 53 in their upward pull on the scale-connected links 55 and 56, regardless of how the weight of the load 3 may be divided between the three-armed levers 50 and bell-crank levers 46.

The vertical fulcrum-blocks 70 and the horizontal knife-edge blocks 76 together form a separated-part knife-edge fulcrum bearing to receive the lateral or horizontal strain upon the fulcra of the three-armed levers 50, due to the horizontal pull of the long horizontal links 54 upon their upstanding lever-arms 51. This horizontal strain will vary depending upon the position of the load 3 along the weighing platform 17, and will correspondingly vary relatively to the downward strain. Therefore the resultant force of the two strains will sometimes be exerted in one direction and sometimes in another, at varying angles between the vertical and horizontal, but in view of the fact that the horizontal strain and the downward strain are borne independently or separately by separate knife-edge fulcrum bearings, such change in direction of the combined strains or resultant force is of no consequence.

One of the weight-transmitting bell-crank levers 46 and its bearing stand or fulcrum bracket 45 are particularly illustrated in Figs. 7 and 8. The fulcrum bracket 45 has a transverse bar 79 provided with a horizontal fulcrum-block 80 and has a pair of upstanding end lugs 81, each of which is provided with a vertical fulcrum-block 82 facing towards the weight-carrying lever-arm 48 of the bell-crank lever 46. The bell-crank lever 46 has, in line with its upstanding lever-arm 47, a socket 83 containing a vertically slidable knife-edge block 84, to fulcrum at its knife-edge upon the upper surface of the fulcrum block 80, and, at each end of the socket 83 and at the sides of the horizontal lever-arm 48, has a socket 85, each of the sockets 85 containing a horizontally slidable knife-edge block 86, to fulcrum at its knife-edge upon the vertical fulcrum surface of the fulcrum block 82. A pair of thrust-screws 87 provide for vertical adjustment of the knife-edge block 84, which may be fixed in position by means of a pair of set-screws or clamp-screws 88. A thrust screw 89 for each of the knife-edge blocks 86 provides for its horizontal adjustment, and it may be clamped in place by means of a set screw 90. The middle fulcrum bearing provided by the horizontal fulcrum-block 80 and vertical knife-edge block 84 receives the downward strain or weight which comes upon the horizontal lever-arm 48 from the connection thereto of the platform-connected suspension link 43. The separated-part fulcrum bearing, provided by the vertical fulcrum-blocks 82 and horizontal knife-edge blocks 86, receives the lateral or horizontal strain due to the pull of the upstanding lever-arm 47 upon the long horizontal lever connecting link 54. The downward and the horizontal strains upon the fulcra of the bell-crank levers 46 will vary, depending upon the position of the load 3 along the weighing platform 17.

What I claim is:

1. In a weighing device or scale, in combination a weight transmitting lever having a substantially horizontal arm and a substantially vertical arm, a knife-edge fulcrum bearing to receive downward strain upon the horizontal lever-arm, and a separate knife-edge fulcrum bearing to receive horizontal strain upon the vertical lever-arm, the fulcrum edges of said knife-edge bearings being in axial alignment.

2. In a weighing device or scale, in combination, a weight-transmitting lever having oppositely-directed substantially horizontal arms and a substantially vertical arm and subject to relatively variable vertical and horizontal strains upon its fulcrum, a knife-edge fulcrum bearing to receive the vertical strain, and a separate knife-edge fulcrum bearing to receive the horizontal strain, the fulcrum edges of said knife-edge bearings being in axial alignment.

3. In a weighing device or scale, in combination, a weight-transmitting lever subject to separate strains in different directions upon its fulcrum, separate knife-edge fulcrum bearings, to receive said separate strains, and means providing for adjusting the knife-edges of said bearings to bring said knife-edges into axial alignment.

4. In a weighing device or scale, in combination, a weight-transmitting lever having a substantially horizontal fulcrum subject to vertical strains and to transverse horizontal strains, a knife-edge fulcrum bearing to receive the vertical strain, a separate knife-edge fulcrum bearing to receive the horizontal strain, and means providing for adjusting the knife-edges of said bearings to bring said knife-edges into axial alignment.

5. In a weighing device or scale, in combination, a weight-transmitting lever having a substantially horizontal arm and a substantially vertical arm, a knife-edge fulcrum bearing to receive downward strain upon the horizontal lever-arm, a separate knife-edge fulcrum bearing to receive horizontal strain upon the vertical lever-arm, and means providing for adjusting the knife-edges of said bearings to bring said knife-edges into axial alignment.

6. In a weighing device or scale, in combination, a weight-transmitting lever having oppositely-directed substantially horizontal arms and a substantially vertical arm and subject to relatively variable vertical and horizontal strains upon its fulcrum, a knife-edge fulcrum bearing to receive the vertical strain, a separate knife-edge fulcrum bearing to receive the horizontal strain, and means providing for adjusting the knife-edges of said bearings to bring said knife-edges into axial alignment.

7. In a weighing device or scale, in combination, a weight-transmitting lever subject to separate strains in different directions upon its fulcrum, separate knife-edge fulcrum bearings to receive said separate strains, each of said knife-edge bearings comprising a fulcrum-block having a fulcrum surface and a knife-edge block to fulcrum at its knife-edge upon the fulcrum surface of the fulcrum-block, and means providing for adjusting the knife-edge blocks to bring their knife-edges into axial alignment.

8. In a weighing device or scale, in combination, a weight-transmitting lever having a substantially horizontal fulcrum subject to vertical strain and to horizontal strain, a knife-edge fulcrum bearing to receive the vertical strain, a separate knife-edge fulcrum bearing to receive the horizontal strain, each of said knife-edge bearings comprising a fulcrum-block having a fulcrum surface and a knife-edge block to fulcrum at its knife-edge upon the fulcrum surface of the fulcrum-block, and means providing for adjusting the knife-edge blocks to bring their knife-edges into axial alignment.

9. In a weighing device or scale, in combination, a weight-transmitting lever having a substantially horizontal arm and a substantially vertical arm, a knife-edge fulcrum bearing to receive downward strain upon the horizontal lever-arm, a separate knife-edge fulcrum bearing to receive horizontal strain upon the vertical lever-arm, each of said knife-edge bearings comprising a fulcrum-block having a fulcrum surface and a knife-edge block to fulcrum at its knife-edge upon the fulcrum surface of the fulcrum-block, and means providing for adjusting the knife-edge blocks to bring their knife-edges into axial alignment.

10. In a weighing device or scale, in combination, a weight-transmitting lever having oppositely-directed substantially horizontal arms and a substantially vertical arm and subject to relatively variable vertical and horizontal strains upon its fulcrum, a knife-edge fulcrum bearing to receive the vertical strain, a separate knife-edge fulcrum bearing to receive the horizontal strain, each of said knife-edge bearings comprising a fulcrum-block having a fulcrum surface and a knife-edge block to fulcrum at its knife-edge upon the fulcrum surface of the fulcrum-block, and means providing for adjusting the knife-edge blocks to bring their knife-edges into axial alignment.

11. In a weighing device or scale, in combination, a weight-transmitting lever subject to separate strains in different directions upon its fulcrum, separate knife-edge fulcrum bearings to receive said separate strains, each of said knife-edge bearings comprising a fulcrum-block having a fulcrum surface and a knife-edge block to fulcrum at its knife-edge upon the fulcrum surface of the fulcrum-block, each knife-edge block being slidably mounted for adjustment to bring the knife-edges of the knife-edge blocks into axial alignment, thrust screws to slide the knife-edge blocks for bringing their knife-edges into axial alignment, and clamp screws to hold the adjusted knife-edge blocks against displacement.

12. In a weighing device or scale, in combination, a weight-transmitting lever having a substantially horizontal fulcrum subject to vertical strain and to horizontal strain, a knife-edge fulcrum bearing to receive the vertical strain, a separate knife-edge fulcrum bearing to receive the horizontal strain, each of said knife-edge bearings comprising a fulcrum-block having a fulcrum surface and a knife-edge block to fulcrum at its knife-edge upon the fulcrum surface of the fulcrum-block, each knife-edge block being slidably mounted for adjustment to bring the knife-edges of the knife-edge blocks into axial alignment, thrust screws to slide the knife-edge blocks inward for bringing their knife-edges into axial alignment, and clamp screws to hold the adjusted knife-edge blocks in place.

13. In a weighing device or scale, in combination, a weight-transmitting lever having a substantially horizontal arm and a substantially vertical arm, a knife-edge fulcrum bearing to receive downward strain upon the horizontal lever-arm, a separate knife-edge fulcrum bearing to receive horizontal strain upon the vertical lever-arm, each of said knife-edge bearings comprising a fulcrum-block having a fulcrum surface and a knife-edge block to fulcrum at its knife-edge upon the fulcrum surface of the fulcrum-block, each knife-edge block being slidably mounted for radial adjustment to bring the knife-edges of the knife-edge blocks into axial alignment, thrust screws to slide the knife-edge blocks inward for bringing their knife-edges into axial alignment, and clamp screws to hold the adjusted knife-edge blocks in place.

14. In a weighing device or scale, in combination, a weight-transmitting lever having oppositely-directed substantially horizontal arms and a substantially vertical arm and subject to relatively variable vertical and horizontal strains upon its fulcrum, a knife-edge fulcrum bearing to receive the vertical strain, a separate knife-edge fulcrum bearing to receive the horizontal strain, each of said knife-edge bearings comprising a fulcrum-block having a fulcrum surface and a knife-edge block to fulcrum at its knife-edge upon the fulcrum surface of the fulcrum-block, each knife-edge block being slidably mounted for radial adjustment to bring the knife-edges of the knife-edge blocks into axial alignment, thrust screws to slide the knife-edge blocks inward, and clamp screws to hold the knife-edge blocks in place.

15. In a weighing device, or scale, in combination, a weight-transmitting lever having a substantially horizontal arm and a substantially vertical arm, a knife-edge fulcrum bearing to receive downward strain upon the horizontal lever-arm, and a separate knife-edge fulcrum bearing to receive horizontal strain upon the vertical lever-arm, the fulcrum edges of said knife-edge bearings being in alignment along a common axis, one of said fulcrum bearings comprising similar separated parts disposed at opposite sides of the other fulcrum bearing along said common axis.

16. In a weighing device or scale, in combination, a weight-transmitting lever having oppositely-directed substantially horizontal arms and a substantially vertical arm and subject to relatively variable vertical and horizontal strains upon its fulcrum, a knife-edge fulcrum bearing to receive the vertical strain, and a separate knife-edge fulcrum bearing to receive the horizontal strain, the fulcrum edges of said knife-edge bearings being in alignment along a common axis, one of said fulcrum bearings comprising similar separated parts disposed at opposite sides of the other fulcrum bearing along said common axis.

17. In a weighing device or scale, in combination, a weight-transmitting lever having an upstanding arm and a substantially horizontal arm, said lever being provided with a downwardly projecting knife-edge and with a second knife-edge projecting substantially horizontally inwardly in relation to said horizontal lever-arm, said knife-edges forming fulcrum edges having a common axis, one of said knife-edges being in separated parts and the other said knife-edge being located between said separated parts along said common axis, and a bearing stand or bracket having a horizontal fulcrum surface upon which said downwardly projecting knife-edge fulcrums and having a vertically disposed fulcrum surface upon which said horizontally projecting knife-edge fulcrums, one of said fulcrum surfaces being in separated parts along said common axis and the other fulcrum surface being located between said separated parts of the separated part fulcrum surface along said axis, the separated-part knife-edge being fulcrumed upon the separated-part fulcrum surface.

18. In a weighing device or scale, in combination, a bearing stand or bracket having thereon at least three fulcrum surfaces, said fulcrum surfaces being arranged alternately vertically and horizontally along a common axis, a weight-transmitting lever having an upstanding arm and a substantially horizontal arm, knife-edge blocks mounted upon said lever and corresponding in number and arrangement with said fulcrum surfaces so as to cooperate therewith, said knife-edge blocks having their knife-edges projecting inwardly from the respective lever-arms towards said common axis, and means providing for adjusting the knife-edge blocks to bring their knife-edges into alignment at said common axis.

19. In a weighing device or scale, in combination, a bearing stand or bracket having thereon at least three fulcrum surfaces, said fulcrum surfaces being arranged alternately vertically and horizontally along a common axis, a weight-transmitting lever having an upstanding arm and a substantially horizontal arm, knife-edge blocks mounted upon said lever and corresponding in number and arrangement with said fulcrum surfaces so as to cooperate therewith, said knife-edge blocks having their knife-edges projecting inwardly from the respective lever-arms towards said common axis, each of the knife-edge blocks being slidably mounted for radial adjustment, thrust screws to slide the knife-edge blocks inward to bring their knife-edges into alignment at said common axis, and clamp screws for clamping the knife-edge blocks firmly in place.

20. In a weighing device or scale having a weighing platform, a bell-crank lever at one end of the platform having a substantially horizontal weight-carrying arm and a substantially vertical arm, a link connecting the adjacent end of the platform to said horizontal lever arm, a three-armed lever at the other end of the platform having a substantially vertical arm and oppositely extending substantially horizontal arms one of which is a weight-carrying arm extending in the same direction as the weight-carrying arm of said bell-crank lever, a link connecting the adjacent end of the platform to the weight-carrying arm of the three-armed lever, a link connecting the vertical arms of said levers, a weigh-beam, and connections between the weigh-beam and the remaining horizontal arm of the three-armed lever; the combination of a knife-edge fulcrum bearing for said bell-crank lever to receive the downward strain upon the weight-carrying arm thereof, a separate knife-edge fulcrum bearing for said bell-crank lever to receive the horizontal strain of said lever-connecting link upon its vertical arm, the fulcrum edges of said knife-edge bearings being in axial alignment; a knife-edge fulcrum bearing for said three-armed lever to receive the downward strain upon its horizontal lever arms, and a separate knife-edge fulcrum bearing for said three-armed lever to receive the horizontal strain of said lever-connecting link upon its vertical arm, the fulcrum edges of said knife-edge bearings for the three-arm lever being in axial alignment.

21. In a cane hoisting and weighing device having a frame forming a tower, a weighing platform at the top of the tower, means for hoisting a load of cane so that it will be suspended from the platform and the weight borne thereby, said means providing for traversing the hoisted load longitudinally of the platform, a pair of bell-crank levers at one end of the platform fulcrumed upon the top of the tower upon fulcrum axes transverse to the length of the platform, each of said levers having an upstanding leverarm and a substantially horizontal lever-arm, a platform-supporting suspension-link connecting the horizontal lever-arm to the adjacent corner of the platform, a pair of three-armed levers at the other end of the platform fulcrumed upon the top of the tower upon fulcrum axes transverse to the length of the platform, each of said three-armed levers having an upstanding arm and oppositely projecting substantially horizontal arms, so that one of said horizontal arms of the three-armed lever projects towards the corresponding bell-crank lever, a platform-supporting suspension-link connecting the latter lever-arm to the adjacent corner of the platform, a link connecting the upstanding arm of each of the three-armed levers to the upstanding arm of each of the corresponding bell-crank levers, a weighing scale, and a pair of links connecting the scale to the remaining horizontal arms of the three-armed levers; the combination of a knife-edge fulcrum bearing for each of said bell-crank levers to receive the downward strain upon the horizontal arm, a separate knife-edge fulcrum bearing for each of said bell-crank levers to receive the horizontal strain of the lever-connecting link upon the upstanding arm of the bell-crank lever, the knife-edges of said bearings being in axial alignment, a knife-edge fulcrum bearing for each of said three-armed levers to receive the downward strain upon its horizontal arms, and a separate knife-edge fulcrum bearing for each of said three-armed levers to receive the horizontal strain of the lever-connecting link upon the upstanding arm of the three-armed lever, the knife-edges of the fulcrum bearing for the three-armed lever being in axial alignment.

In testimony whereof I have signed this specification this 14th day of February, 1923.

HORACE F. RUGGLES.